(12) United States Patent
Neubaur et al.

(10) Patent No.: US 12,466,388 B2
(45) Date of Patent: Nov. 11, 2025

(54) METHOD FOR OPERATING A MOTOR VEHICLE DRIVE TRAIN AND ELECTRONIC CONTROL UNIT FOR CARRYING OUT SAID METHOD

(71) Applicants: ZF Friedrichshafen AG, Friedrichshafen (DE); Bayerische Motoren Werke AG (BMW), Munich (DE)

(72) Inventors: Roland Neubaur, Vilgertshofen (DE); Florian Hannemann, Gaißach (DE); Markus Pfisterer, Puchheim (DE); Wolfgang Fickler, Munich (DE)

(73) Assignees: ZF Friedrichshafen AG, Friedrichshafen (DE); Bayerische Motoren Werke AG (BMW), Munich (DE)

( * ) Notice: Subject to any disclaimer, the term of this patent is extended or adjusted under 35 U.S.C. 154(b) by 176 days.

(21) Appl. No.: 17/922,035

(22) PCT Filed: Apr. 29, 2021

(86) PCT No.: PCT/EP2021/061214
§ 371 (c)(1),
(2) Date: Oct. 28, 2022

(87) PCT Pub. No.: WO2021/219766
PCT Pub. Date: Nov. 4, 2021

(65) Prior Publication Data
US 2023/0264682 A1 Aug. 24, 2023

(30) Foreign Application Priority Data
Apr. 29, 2020 (DE) ...................... 10 2020 205 395.2

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01); *B60W 20/15* (2016.01);
(Continued)

(58) Field of Classification Search
CPC ...... B60W 20/40; B60W 20/15; B60W 10/02; B60W 10/06; B60W 2710/025;
(Continued)

(56) References Cited

U.S. PATENT DOCUMENTS

| 7,223,200 | B2* | 5/2007 | Kojima | B60W 20/30 |
| | | | | 475/5 |
| 8,065,047 | B2 | 11/2011 | Hasegawa et al. | |
| 2004/0112171 | A1* | 6/2004 | Kuhstrebe | B60K 6/547 |
| | | | | 903/945 |
| 2006/0137921 | A1* | 6/2006 | Colvin | B60W 10/08 |
| | | | | 180/65.23 |

(Continued)

FOREIGN PATENT DOCUMENTS

| DE | 10260435 A1 | 7/2004 |
| DE | 102010028025 A1 | 10/2011 |

(Continued)

OTHER PUBLICATIONS

English Translation of JP-2000001133-A (Year: 2000).*
(Continued)

*Primary Examiner* — Ramya P Burgess
*Assistant Examiner* — Preston Jay Miller
(74) *Attorney, Agent, or Firm* — Dority & Manning, P.A.

(57) ABSTRACT

A method for operating a drive train having a starting component between an electric machine and an output shaft of a transmission, and a separating clutch between an internal combustion engine and the electric machine, with a rotor of the electric machine being coupled to the input shaft (Continued)

of the transmission, where the method initially drives a motor vehicle solely by the electric machine while the starting component is engaged or slipping and the separating clutch is disengaged. The method then engages the separating clutch to crank the internal combustion engine. The method disengages the separating clutch after cranking, with an output-side rotational speed of the separating clutch being lower than an idling speed of the internal combustion engine. Subsequently, the method engages the separating clutch to drive the motor vehicle with the internal combustion engine when a target drive torque reaches or exceeds a limit.

14 Claims, 6 Drawing Sheets

(51) Int. Cl.
  *B60W 10/06* (2006.01)
  *B60W 20/15* (2016.01)
  *F02N 11/08* (2006.01)

(52) U.S. Cl.
  CPC ... *F02N 11/0851* (2013.01); *B60W 2710/025* (2013.01); *B60W 2710/0644* (2013.01)

(58) Field of Classification Search
  CPC ......... B60W 2710/0644; B60W 10/08; B60W 30/18027; B60W 30/186; F02N 11/0851; Y02T 10/62; B60K 6/48
  USPC .......................................................... 701/22
  See application file for complete search history.

(56) References Cited

U.S. PATENT DOCUMENTS

| | | | | |
|---|---|---|---|---|
| 2007/0272456 | A1* | 11/2007 | Shiiba ................. | B60W 30/186 903/914 |
| 2009/0143950 | A1* | 6/2009 | Hasegawa ............. | B60W 10/08 701/68 |
| 2012/0108387 | A1* | 5/2012 | Akebono ............ | B60W 30/186 477/12 |
| 2012/0264565 | A1* | 10/2012 | Kobayashi .............. | B60L 50/16 477/5 |
| 2013/0296116 | A1* | 11/2013 | Dai ........................ | B60W 20/40 477/5 |
| 2019/0344781 | A1* | 11/2019 | Deprez ................. | B60W 10/10 |
| 2023/0011692 | A1* | 1/2023 | Jonuscheit ............ | B60W 10/02 |

FOREIGN PATENT DOCUMENTS

| | | | |
|---|---|---|---|
| DE | 102012220478 | A1 | 5/2014 |
| DE | 102016208662 | A1 * | 11/2017 |
| DE | 102018204907 | A1 * | 10/2019 |
| EP | 2065243 | A2 | 6/2009 |
| EP | 2065244 | A2 | 6/2009 |
| JP | 2000001133 | A * | 1/2000 ............. B60K 6/543 |

OTHER PUBLICATIONS

English Translation of DE-102018204907-A1 (Year: 2019).*
English Translation of DE-102016208662-A1 (Year: 2017).*
International Search Report (English Translation) PCT/EP2021/061214, dated Jul. 29, 2021. (2 pages).
German Search Report DE 10 2020 205 395.2, dated Feb. 9, 2021. (12 pages).

* cited by examiner

METHOD FOR OPERATING A MOTOR VEHICLE DRIVE TRAIN AND ELECTRONIC CONTROL UNIT FOR CARRYING OUT SAID METHOD

CROSS-REFERENCE TO RELATED APPLICATION

The present application is related and has right of priority to German Patent Application No. 10 2020 205 395.2 filed on Apr. 29, 2020, and is a nationalization of PCT/EP2021/061214 filed in the European Patent Office on Apr. 29, 2021, both of which are incorporated by reference in their entirety for all purposes.

FIELD OF THE INVENTION

The invention relates generally to a method for operating a motor vehicle drive train, in particular for a motor vehicle having a hybrid drive. The invention further relates generally to an electronic control unit for carrying out said method.

BACKGROUND

Patent application EP 2 065 244 A2 teaches a method for operating a hybrid vehicle, which utilizes an internal combustion engine and an electric motor to drive the vehicle. A clutch is arranged between the internal combustion engine and the electric motor. A second clutch is arranged between the electric motor and the driving wheels of the motor vehicle. Moreover, a temperature detector is provided for detecting the temperature of the second clutch. A selection is made between two different operating modes depending on the temperature of the second clutch. In a first of the two different operating modes, the first clutch is engaged, the second clutch is operated in a slip state or slipping condition, and the internal combustion engine is operated at a first rotational speed. In a second of the two different operating modes, the first clutch is disengaged, the second clutch is operated in a slip state, and the electric motor is operated at a second rotational speed, which is lower than the first rotational speed. Due to a method of this type, an overheating of the second clutch is to be avoided by temperature-dependently reducing the differential speed at the second clutch.

This type of mode change, which is dependent on the temperature of the second clutch, cannot be carried out with high dynamics, however, without adversely affecting the ride comfort. As a result, the method does not offer reliable protection against an overheating of the clutch, since the temperature of a clutch increases very rapidly in the continuous slip operation.

SUMMARY OF THE INVENTION

The problem addressed by the method disclosed herein provides reliable protection against an overheating of such a clutch and provides a control unit suitable therefor. A method is provided for operating a motor vehicle drive train, where the motor vehicle drive train includes an internal combustion engine, an electric machine, and a transmission. The transmission is configured to provide different gears or gear speed ratios between an input shaft and an output shaft of the transmission. A rotor of the electric machine is coupled to the input shaft of the transmission. The rotor of the electric machine is coupled to the input shaft directly, enabling the rotor rotational speed to correspond to the rotational speed of the input shaft. Alternatively, the rotor and the input shaft are connected to each other via a transmission gearing.

A starting component is arranged in the power path between the electric machine and the output shaft. The starting component is, for example, a hydraulic torque converter with a torque converter lockup clutch connected in parallel. Alternatively, the starting component is a separate friction clutch. According to another alternative, the starting component is a gear-implementing shift element of the transmission, provided that this shift element is a friction clutch or a friction brake. The starting component permits a torque transmission between at least one of the drive sources of the drive train and the output shaft while forming a differential speed. A separating clutch, particularly a friction clutch, is arranged in the power flow between the internal combustion engine and the electric machine.

At the beginning of an electric starting process, the motor vehicle is driven solely by the electric machine. The separating clutch is disengaged. The starting component is engageable, so that a differential speed does not exist at the starting component. In a state of this type, the rotational speed of the electric machine is directly dependent on the gear engaged in the transmission and on the rotational speed of the output shaft. Alternatively, the starting component is operable in a slip state.

During the electric starting process, the internal combustion engine is cranked using the electric machine by engaging the separating clutch. At a sufficient rotational speed of the internal combustion engine, the internal combustion engine starts operating and independently continues to operate and the separating clutch is subsequently disengaged again.

According to the invention, it is provided that the motor vehicle is still driven solely by the electric machine after the internal combustion engine has been cranked. The output-side rotational speed of the separating clutch is lower than an idling speed of the internal combustion engine. The separating clutch is engaged to support the motor vehicle drive by the internal combustion engine only if a target drive torque of the motor vehicle reaches or exceeds a limit value.

Due to a method of this type, the energy input into the starting component is kept low, since the output-side rotational speed of the separating clutch is lower after the cranking of the internal combustion engine than the idling speed of the internal combustion engine. Therefore, an overheating of the starting component is avoided. If the necessary drive torque increases above the limit value, the internal combustion engine, which is already running, is couplable to the drive train with high dynamics.

Preferably, the output-side rotational speed of the separating clutch remains lower after the cranking of the internal combustion engine than the idling speed of the internal combustion engine at least for as long as it takes until the target drive torque reaches or exceeds the limit value. As a result, the energy input into the starting component continues to be kept low.

Preferably, the starting component is operated in a slip state during the cranking of the internal combustion engine, wherein the slip at the starting component is reduced again, in particular to zero, after the separating clutch has been disengaged. As a result, torsional vibrations, which arise during the cranking of the internal combustion engine, are decoupled from the output shaft. The rapid build-up of the starting-component slip is accelerated via an appropriate open-loop control of the electric machine.

In some instances, the slip at the starting component is enlarged when the target drive torque reaches or exceeds the limit value. Therefore, a differential speed at the separating clutch is minimized upon engagement of the separating clutch, so that the separating clutch is thermally loaded as little as possible. The rapid build-up of the starting-component slip is accelerated via an appropriate open-loop control of the electric machine.

In one instance, the slip at the starting component remains unchanged when the target drive torque of the motor vehicle reaches or exceeds the limit value, so that the separating clutch is engaged during a continuous slip operation of the separating clutch. In one instance, the starting component as well as the separating clutch are operated with continuous slip when the target drive torque of the motor vehicle reaches or exceeds the limit value.

Which of the three aforementioned method sequences is utilized depends on the thermal load capacity of the starting component and of the separating clutch. Additionally, this also depends on the magnitude of the demanded target drive torque.

Preferably, the internal combustion engine, after having been cranked, is actively operated without contributing to the drive of the motor vehicle and the internal combustion engine is only coupled to the drive train if the target drive torque reaches or exceeds the limit value. The internal combustion engine is preferably operated in a speed-controlled manner, wherein a target rotational speed of the internal combustion engine depends on the present target drive torque. As a result, acoustic feedback on the demanded target drive torque is provided to a driver of the motor vehicle even though the internal combustion engine does not contribute to the drive of the motor vehicle.

As the solution to the problem, an electronic control unit is also provided, which is configured to carry out the method described at the outset. The electronic control unit is providable for carrying out other functions of the drive train control system.

BRIEF DESCRIPTION OF THE DRAWINGS

Exemplary embodiments of the invention are described in detail in the following. Wherein.

DETAILED DESCRIPTION

Figure 1:
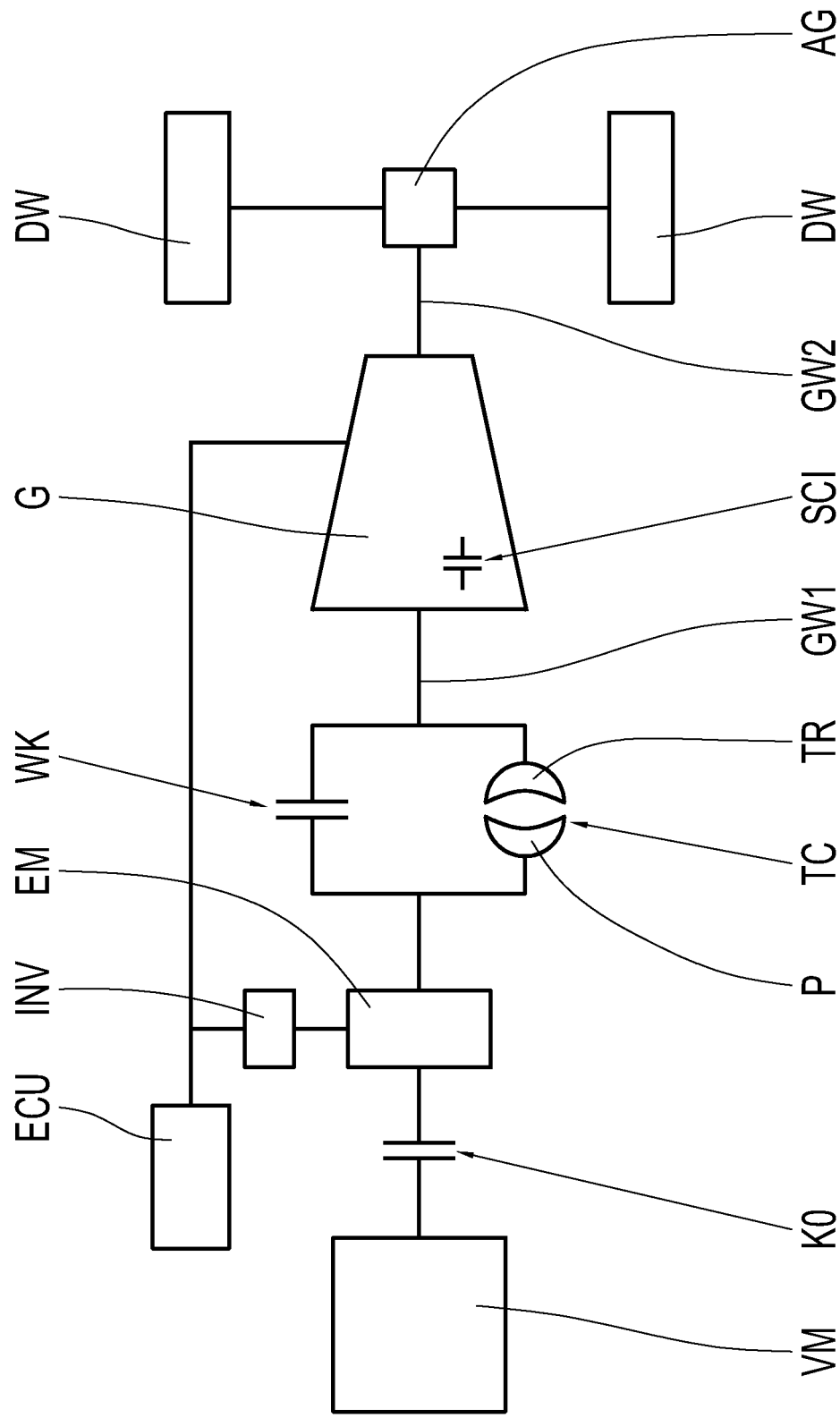
FIG. 1 illustrates a schematic view of a drive train for a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a hybrid drive train for a motor vehicle. The hybrid drive train includes an internal combustion engine VM and an electric machine EM. A separating clutch K0 is arranged between the internal combustion engine VM and the electric machine EM. Using the separating clutch K0, a power flow is connectable between the internal combustion engine VM and the electric machine EM. The hybrid drive train also has a transmission G including an input shaft GW1 and an output shaft GW2. The output shaft GW2 is connected to a differential gear AG, where the power present at the output shaft GW2 is distributed to driving wheels DW of the motor vehicle via the differential gear AG. A torque converter TC is arranged in the power flow between the electric machine EM and the input shaft GW1. The torque converter TC has an impeller P and a turbine wheel TR, where the impeller P is connected to the electric machine EM and the turbine wheel TR is connected to the input shaft GW1. The impeller P and the turbine wheel TR cooperate hydrodynamically such that power from the impeller P is hydrodynamically transmittable to the turbine wheel TR. The impeller P and the turbine wheel TR are mechanically connectable to each other by engaging a torque converter lockup clutch WK.

The transmission G is configured for implementing different gears or gear speed ratios between the input shaft GW1 and the output shaft GW2. Multiple shift elements are provided for implementing the gears. One shift element SCI of the multiple shift elements is represented in FIG. 1, for example. The shift elements, including the shift element SCI, cooperate with planetary gear sets (not represented in FIG. 1), in order to implement the different gears or gear speed ratios between the input shaft GW1 and the output shaft GW2. This is to be considered merely as an example. Instead of, or in addition to, the planetary gear sets, it is also possible to utilize spur gear stages and/or one or multiple toroidal drive(s), which cooperate(s) with the shift elements, including the shift element SCI, in order to implement gears.

Moreover, an electronic control unit ECU is provided. The control unit ECU has a communication link to a power converter INV, which is associated with the electric machine EM for the open-loop control of the electric machine EM. The control unit ECU also has a communication link to the transmission G. The transmission G includes an actuator for actuating the shift element SCI. Moreover, the transmission G also has an actuator for actuating the torque converter lockup clutch WK, and an actuator for actuating the separating clutch K0. This is also to be considered merely as an example. The separating clutch K0 could also be actuated by an actuator, which is independent of the transmission G. The same applies for the actuation of the torque converter lockup clutch WK.

The torque converter lockup clutch WK is a torque-transmitting element between the electric machine EM and the output shaft GW2. If the torque converter lockup clutch is operated in the slip state, a torque is transmittable from the internal combustion engine VM and/or from the electric machine EM to the driving wheels DW without a fixed rotational speed relationship existing between the output shaft GW2 and the electric machine EM. The torque converter lockup clutch WK is thereby operable as a starting component.

Figure 2:
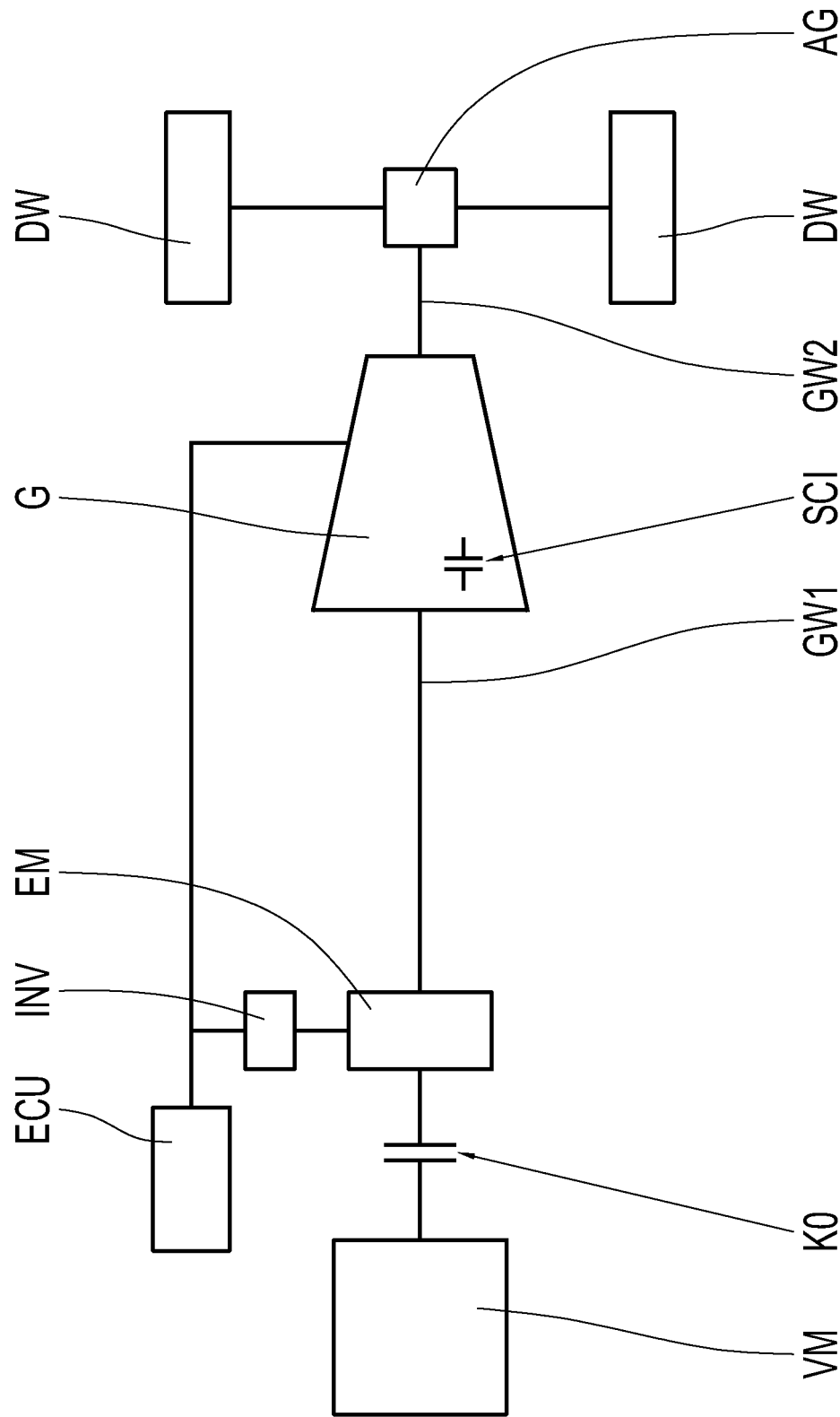
FIG. 2 illustrates a schematic view of another drive train for a motor vehicle.

FIG. 2 shows a schematic view of another hybrid drive train for a motor vehicle, which essentially corresponds to the drive train represented in FIG. 1, except that the torque converter is omitted, so that the electric machine EM is directly connected to the input shaft GW1. If the shift element SCI contributes to the gear implementation in the transmission G, the shift element SCI is a torque-transmitting element between the electric machine EM and the output shaft GW2. If the shift element SCI is operated in the slip state, a torque is transmittable from the internal combustion engine VM and/or from the electric machine EM to the driving wheels DW without a fixed rotational speed relationship existing between the output shaft GW2 and the input shaft GW1. Thus, the shift element SCI is operable as a starting component.

Figure 3:
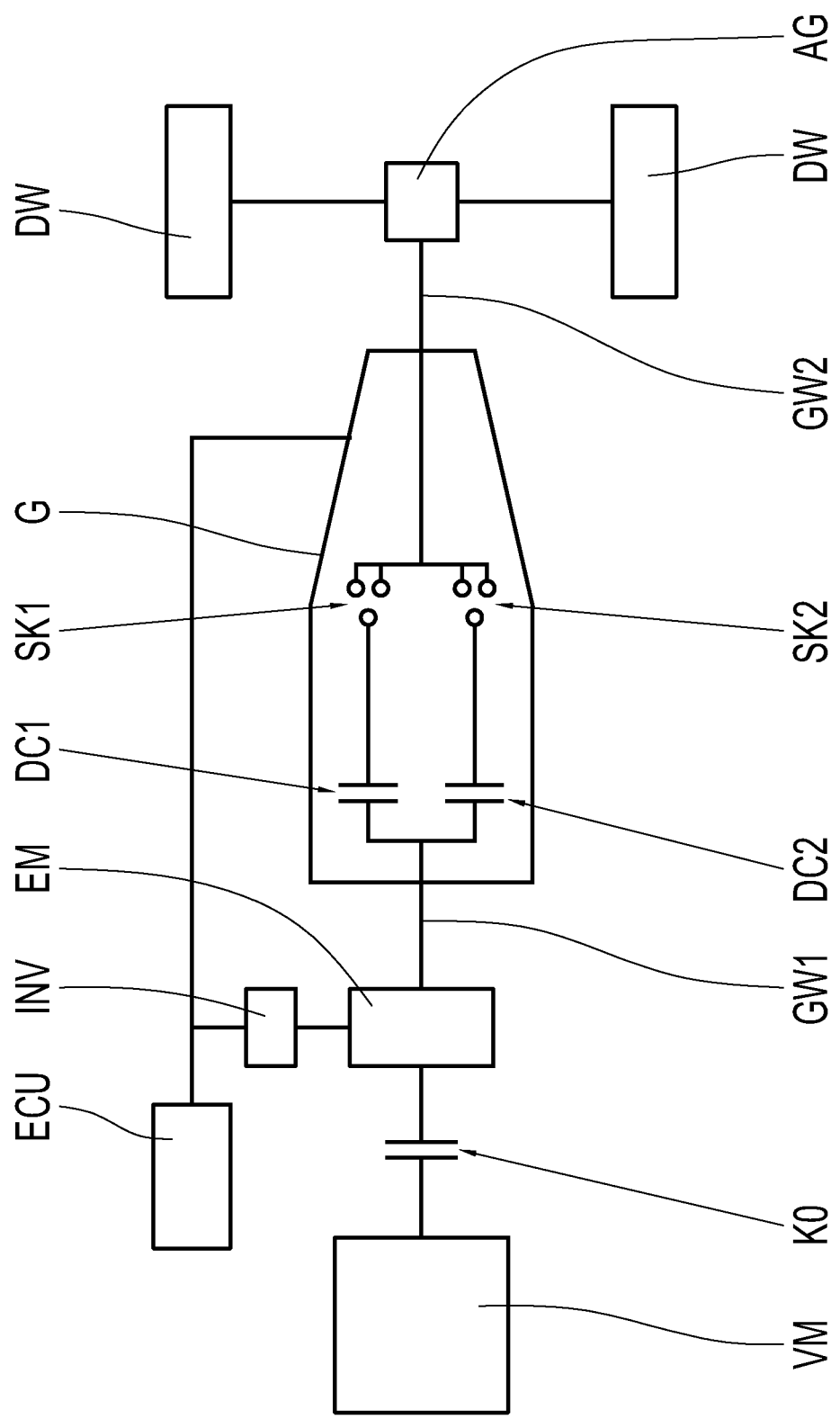
FIG. 3 illustrates a schematic view of a further drive train for a motor vehicle.

FIG. 3 shows a schematic view of another hybrid drive train for a motor vehicle, which essentially corresponds to the drive train represented in FIG. 1, except that the torque converter is omitted, so that the electric machine EM is directly connected to the input shaft GW1, and that the transmission G is now a dual-clutch transmission, wherein the dual clutch is formed by the clutches DC1 and DC2. A respective gearshift clutch unit SK1, SK2 is associated with each of the clutches DC1, DC2. Each of the gearshift clutch units SK1, SK2 has at least two form-locking clutches, which include a synchronizing unit (not represented in FIG. 3). On the output end, the gearshift clutch units SK1, SK2 are connected to the output shaft GW2. If one of the dual clutches DC1, DC2 is operated in the slip state, a torque is transmittable from the internal combustion engine VM and/or from the electric machine EM to the driving wheels DW without a fixed rotational speed relationship existing between the output shaft GW2 and the input shaft GW1. The clutches DC1, DC2 are therefore operable as a starting component.

Figure 4:
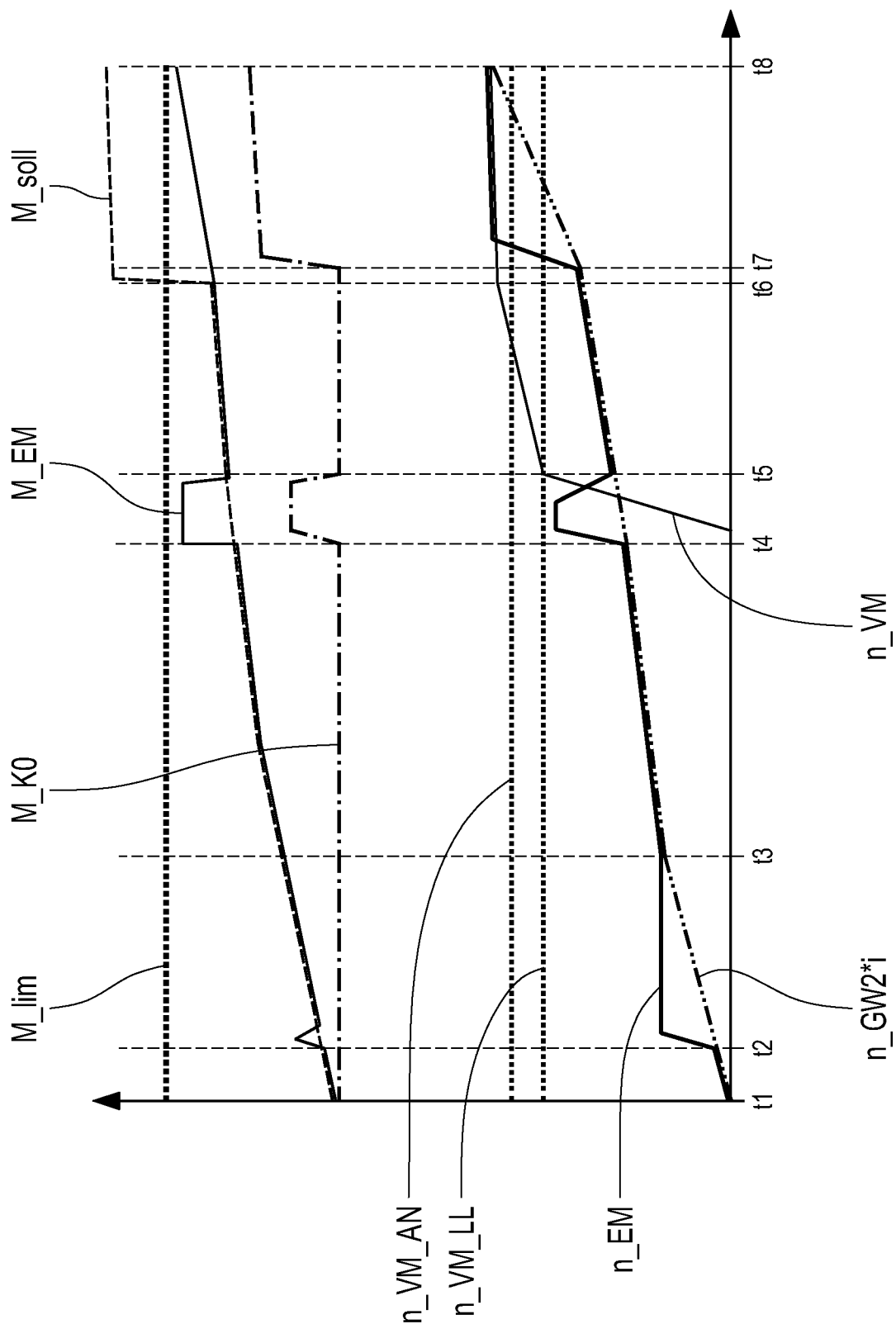
FIG. 4 illustrates a first example time profile for different variables of any of the drive trains illustrated in FIGS. 1-3.

FIG. 4 shows the time profile for different variables of any one of the drive trains according to FIG. 1, FIG. 2, or FIG. 3 during a starting process, including a target drive torque M_soll, a torque M_EM of the electric machine EM, a limit value M_lim, a torque M_K0 transmitted by the separating clutch K0, a rotational speed n_EM of the electric machine EM, a rotational speed n_GW2*i of the output shaft GW2 in relation to the present transmission ratio of the transmission G, a rotational speed n_VM of the internal combustion engine VM, an idling speed n_VM_LL of the internal combustion engine VM, and a starting speed n_VM_AN of the internal combustion engine VM.

A starting process of the motor vehicle having one of the drive trains according to FIG. 1, FIG. 2, or FIG. 3 begins at a point in time t1. In this starting process, the vehicle is driven solely by the electric machine EM, wherein the separating clutch K0 is disengaged and, thus, the torque transmission M_K0 of the separating clutch is equal to zero. Any drag losses of the disengaged separating clutch K0 are not taken into account in this schematic view. The starting component WK, SCI, DC1, DC2 is completely engaged, and so the rotational speed n_GW2*i corresponds to the rotational speed n_EM of the electric machine EM. The torque M_EM of the electric machine EM is therefore transmitted to the drive output GW2 in a slip-free manner.

The torque M_EM of the electric machine EM is briefly increased at a point in time t2, enabling the starting component WK, SCI, DC1, DC2 to assume a slip state. The electric machine EM is operated at a constant rotational speed n_EM once a defined rotational speed value has been reached. An approach of this type is necessary, for example, to transmit the target drive torque M_soll in the transmission G. This is the case because the necessary contact force of hydraulically actuated shift elements of the transmission G increases as the target drive torque M_soll increases, and so a hydraulic pump driven by the input shaft GW1 is to be operated at an appropriate rotational speed to provide the necessary pressure and the necessary flow rate.

The rotational speed n_GW2*i reaches the defined rotational speed value of the electric machine EM at a point in time t3. As the rotational speed n_GW2*i now continues to increase, the starting component WK, SCI, DC1, DC2 is engaged, in order to avoid thermal energy input into the starting component WK, SCI, DC1, DC2. The torque M_EM of the electric machine EM is therefore transmitted to the drive output GW2 in a slip-free manner.

At a point in time t4, a start of the internal combustion engine VM is demanded due to an operating strategy of the vehicle. For this purpose, the separating clutch K0 is actuated such that a torque M_K0 is transmitted to the internal combustion engine VM via the separating clutch K0. The torque necessary for cranking the internal combustion engine VM is provided by increasing the torque M_EM of the electric machine EM. The starting component WK, SCI, DC1, DC2 is operated in a slip state in order to decouple the output shaft GW2 from vibrations of the internal combustion engine start. The separating clutch K0 is disengaged again after the cranking process, so that the motor vehicle is still driven solely by the electric machine EM. The slip state at the starting component WK, SCI, DC1, DC2 is phased out again such that the starting component WK, SCI, DC1, DC2 is operated without slip at the point in time t5. The rotational speed n_EM of the electric machine EM is lower than the idling speed n_VM_LL.

If the internal combustion engine VM is started at the point in time t5 and is capable of operating independently, the rotational speed VM_n of the internal combustion engine VM is selected depending on the target drive torque M_soll, so that the rotational speed VM_n of the internal combustion engine VM increases as the target drive torque M_soll increases. As a result, the driver of the motor vehicle is provided with acoustic feedback on the increasing target drive torque M_soll.

At a point in time t6, the target drive torque M_soll is considerably increased, for example, due to an appropriate actuation of an accelerator pedal of the motor vehicle. The target drive torque M_soll exceeds the limit value M_lim. In response, the torque M_K0 transmitted by the separating clutch K0 is increased at the point in time t7, so that the internal combustion engine VM contributes to the drive of the motor vehicle. In order to keep the differential speed at the separating clutch K0 low or to reduce this to zero, the rotational speed n_EM of the electric machine EM is increased such that the starting component WK, SCI, DC1, DC2 is transferred into a slip state. At a point in time t8, the rotational speed n_GW2*i reaches the rotational speed n_EM of the electric machine EM, whereupon the starting component WK, SCI, DC1, DC2 is transferred into an engaged condition again.

Figure 5:
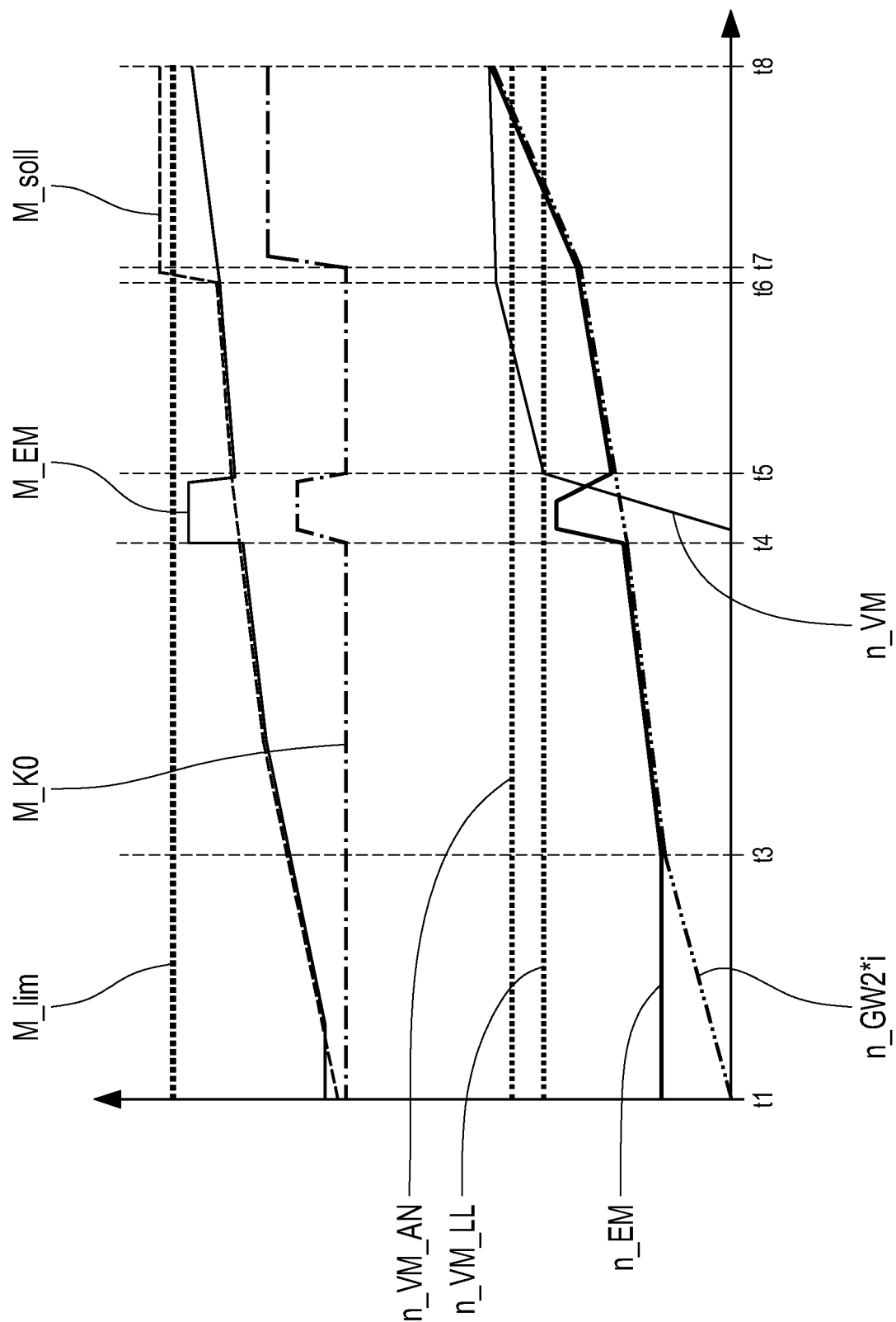
FIG. 5 illustrates a second example time profile for the different variables of any of the drive trains illustrated in FIGS. 1-3.

FIG. 5 shows another time profile for different variables of any one of the drive trains according to FIG. 1, FIG. 2, or FIG. 3 during a starting process. The variables represented in FIG. 5 and the profile largely correspond to the profile represented in FIG. 4, and so reference is made to the description of FIG. 4.

In contrast to the sequence according to FIG. 4, in the sequence according to FIG. 5, the rotational speed n_EM of the electric machine EM is already greater than zero at the point in time t1, and assumes a constant value. As the target drive torque M_soll increases, the starting component WK, SCI, DC1, DC2 is actuated such that a torque is transmitted via the starting component WK, SCI, DC1, DC2, so that the rotational speed n_GW2*i increases and the motor vehicle begins to run.

In the profile according to FIG. 5, the target drive torque M_soll only slightly exceeds the limit value M_lim at the point in time t6, in contrast to the profile according to FIG. 4. Due to this only slight exceedance, the starting component WK, SCI, DC1, DC2 remains engaged also after the point in time t7, so that the differential speed at the separating clutch K0 is first reduced at the point in time t8.

Figure 6:
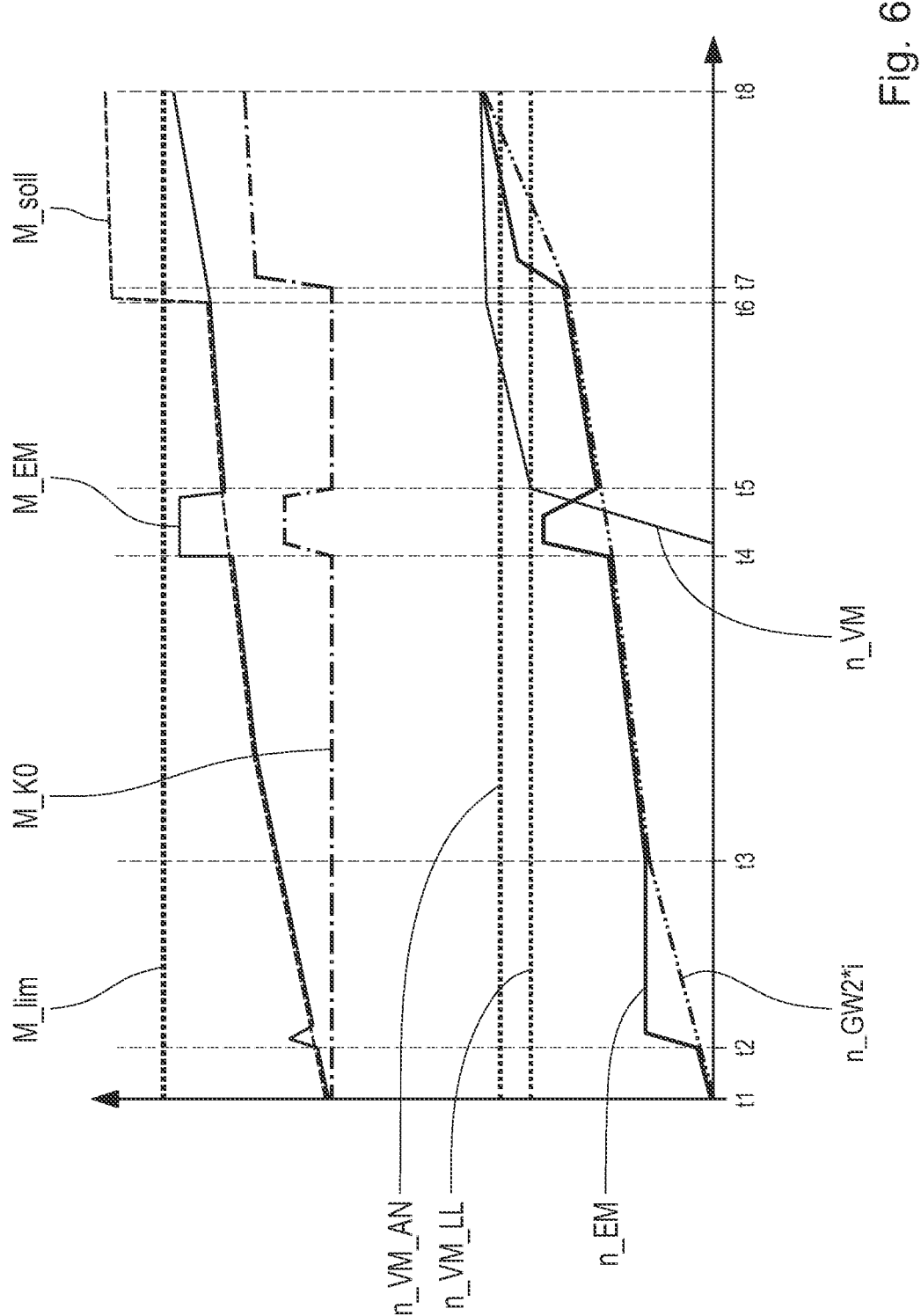
FIG. 6 illustrates a third example time profile for the different variables of any of the drive trains illustrated in FIGS. 1-3.

FIG. 6 shows another time profile for different variables of any one of the drive trains according to FIG. 1, FIG. 2, or FIG. 3 during a starting process. The variables represented in FIG. 6 and the profile largely correspond to the profile represented in FIG. 4, and so reference is made to the description of FIG. 4.

In contrast to the profile according to FIG. 4, in the profile according to FIG. 6, the electric machine EM is actuated after the point in time t7 such that a slip state is brought about at the starting component WK, SCI, DC1, DC2, but the differential speed at the separating clutch K0 is not completely phased out. Rather, the separating clutch K0 as well as the starting component WK, SCI, DC1, DC2 are operated in the slip state, so that the thermal load is divided over the starting component WK, SCI, DC1, DC2 and over the separating clutch K0.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
n_VM rotational speed of the internal combustion engine
n_VM_LL idling speed of the internal combustion engine
n_VM_AN starting speed of the internal combustion engine
G transmission
GW1 input shaft
GW2 output shaft
n_GW2*i rotational speed of the output shaft GW2 in relation to the transmission
ratio of the transmission
K0 separating clutch
M_K0 torque transmission of the separating clutch
EM electric machine
n_EM rotational speed of the electric machine
TC torque converter
P impeller
TR turbine wheel
WK torque converter lockup clutch
SCI shift element
DC1, DC2 clutch
SK1, SK2 gearshift clutch unit
M_soll target drive torque
M_lim limit value
AG differential gear
DW driving wheel
ECU control unit
INV power converter

The invention claimed is:

1. A method for operating a drive train of a motor vehicle, the drive train comprising an internal combustion engine (VM), an electric machine (EM) having a rotor (R), a transmission (G) for providing different gear speed ratios between an input shaft (GW1) and an output shaft (GW2) of the transmission (G), a starting component (WK, SCI, DC1, DC2) in power flow between the electric machine (EM) and the output shaft (GW2), and a separating clutch (K0) in power flow between the internal combustion engine (VM) and the electric machine (EM), with the rotor (R) of the electric machine (EM) being coupled to the input shaft (GW1), the method comprising:
   driving the motor vehicle solely by the electric machine (EM) during a first stage of an electric starting process while the starting component (WK, SCI, DC1, DC2) is engaged or in a slip state, and while the separating clutch (K0) is disengaged;
   engaging the separating clutch (K0) during a second stage of the electric starting process to crank the internal combustion engine (VM) using the electric machine (EM), the second stage being subsequent to the first stage;
   disengaging the separating clutch (K0) and continuing driving the motor vehicle solely by the electric machine (EM) during a third stage of the electric starting process in which a target drive torque (M_soll) of the motor vehicle increases after the cranking of the internal combustion engine (VM), with an output-side rotational speed (n_EM) of the separating clutch (K0) being lower than an idling speed (n_VM_LL) of the internal combustion engine (VM), the third stage being subsequent to the second stage; and
   engaging the separating clutch (K0) during a fourth stage of the electric starting process, after the cranking of the internal combustion engine (VM) and disengaging the separating clutch (K0), to support driving the motor vehicle by the internal combustion engine (VM) only when the target drive torque (M_soll) of the motor vehicle reaches or exceeds a limit value (M_lim), the fourth stage being subsequent to the third stage.

2. The method of claim 1, wherein the output-side rotational speed (n_EM) of the separating clutch (K0) remains lower than the idling speed (n_VM_LL) of the internal combustion engine (VM) after the cranking of the internal combustion engine (VM) at least until the target drive torque (M_soll) of the motor vehicle reaches or exceeds the limit value (M_lim).

3. The method of claim 1, further comprising operating the starting component (WK, SCI, DC1, DC2) in the slip state during the cranking of the internal combustion engine (VM), wherein a slip at the starting component (WK, SCI, DC1, DC2) is reduced after the separating clutch (K0) is disengaged after the cranking of the internal combustion engine (VM).

4. The method of claim 3, wherein the slip at the starting component (WK, SCI, DC1, DC2) is reduced to zero after the separating clutch (K0) is disengaged after the cranking of the internal combustion engine (VM).

5. The method of claim 1, wherein a slip at the starting component (WK, SCI, DC1, DC2) is enlarged when the target drive torque (M_soll) of the motor vehicle reaches or exceeds the limit value (M_lim) to minimize a differential speed at the separating clutch (K0) while engaging of the separating clutch (K0).

6. The method of claim 1, wherein a slip at the starting component (WK, SCI, DC1, DC2) remains unchanged when the target drive torque (M_soll) of the motor vehicle reaches or exceeds the limit value (M_lim) so that the separating clutch (K0) is engaged during a continuous slip operation of the separating clutch (K0).

7. The method of claim 1, further comprising operating the starting component (WK, SCI, DC1, DC2) in the slip state and the separating clutch (K0) in a slip state when the target drive torque (M_soll) of the motor vehicle reaches or exceeds the limit value (M_lim).

8. The method of claim 1, further comprising selecting a slip at the starting component (WK, SCI, DC1, DC2) based at least in part on a magnitude of the target drive torque (M_soll) when the target drive torque (M_soll) of the motor vehicle reaches or exceeds the limit value (M_lim).

9. The method of claim 1, further comprising:
actively operating the internal combustion engine (VM) after the cranking of the internal combustion engine (VM); and
coupling the internal combustion engine (VM) to the transmission (G) after the cranking of the internal combustion engine (VM) only when the target drive torque (M_soll) of the motor vehicle reaches or exceeds the limit value (M_lim).

10. The method of claim 9, further comprising operating the internal combustion engine (VM) in a speed-controlled manner after the cranking of the internal combustion engine (VM) until the internal combustion engine (VM) is coupled to the transmission (G).

11. The method of claim 10, wherein operating the internal combustion engine (VM) in the speed-controlled manner comprises operating the internal combustion engine (VM) at a target rotational speed, the target rotational speed being dependent on the target drive torque (M_soll).

12. An electronic control unit (ECU) for open-loop and closed-loop control of a motor vehicle drive train, the electronic control unit (ECU) performing the method of claim 1.

13. The method of claim 1, wherein a rotational speed of the output shaft (nGW2*i) increases from the second stage to the third stage of the electric starting process.

14. The method of claim 1, wherein a rotational speed of the output shaft (nGW2*i) increases in each stage of the electric starting process.

* * * * *